United States Patent [19]
Huber

[11] 3,822,516
[45] July 9, 1974

[54] METHOD OF MAKING AN ENDLESS POWER TRANSMISSION BELT

[75] Inventor: Walter E. Huber, Springfield, Mo.

[73] Assignee: Dayco Corporation, Dayton, Ohio

[22] Filed: Nov. 28, 1972

[21] Appl. No.: 310,053

[52] U.S. Cl. .................. 51/326, 51/5 B, 51/105 R
[51] Int. Cl. ...................... B24b 1/02, B24b 27/06
[58] Field of Search.......... 51/326, 327, 281, 289 R, 51/290, 105 R

[56] References Cited
UNITED STATES PATENTS

| 113,486 | 4/1871 | Bourn | 51/281 R |
|---|---|---|---|
| 2,144,987 | 1/1939 | Miller | 51/327 |
| 2,783,818 | 3/1957 | Kenney | 51/289 R X |
| 3,711,996 | 1/1973 | Braden | 51/5 C |

Primary Examiner—Al Lawrence Smith
Assistant Examiner—Marc R. Davidson

[57] ABSTRACT

A method of making an endless power transmission belt having opposed non-parallel portions is provided wherein a belt construction is built on a mandrel and ground with a contoured grinding wheel to precisely define the opposed non-parallel portions of the belt in a simultaneous manner.

12 Claims, 6 Drawing Figures

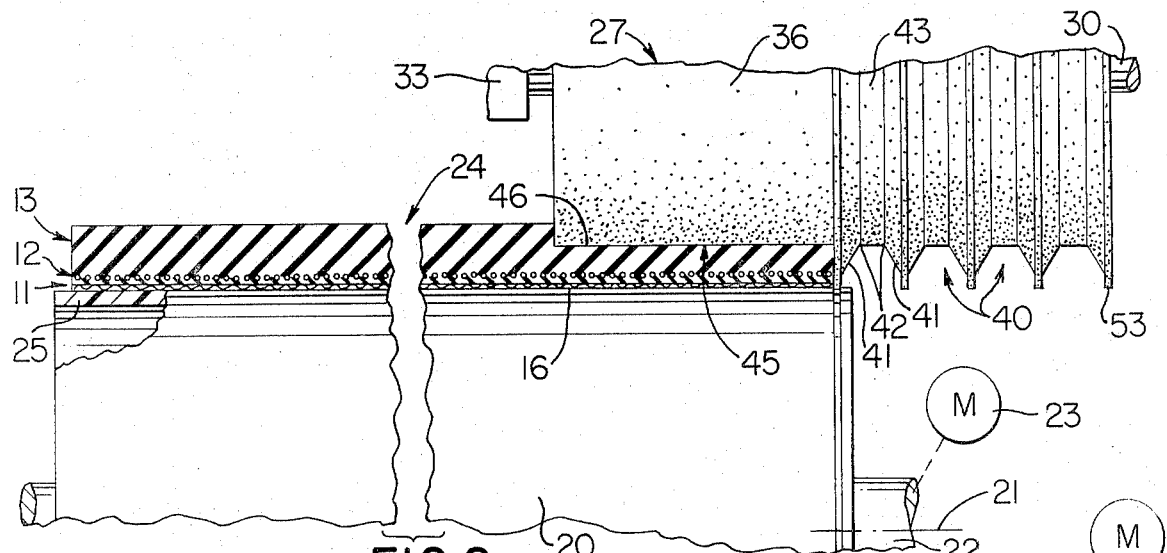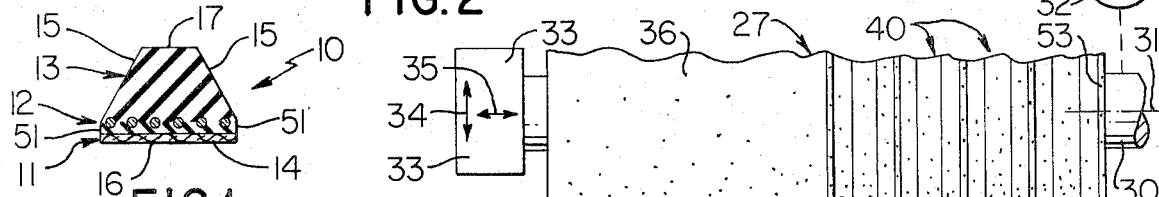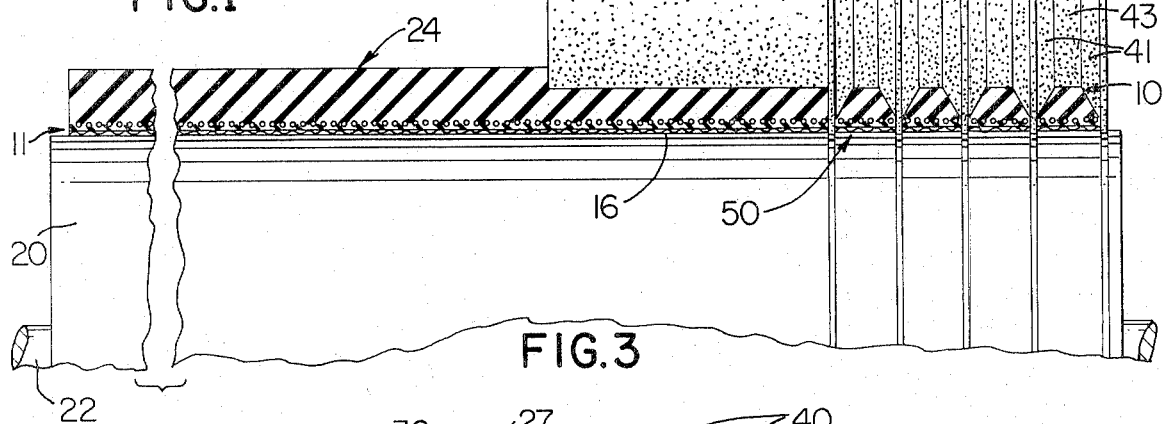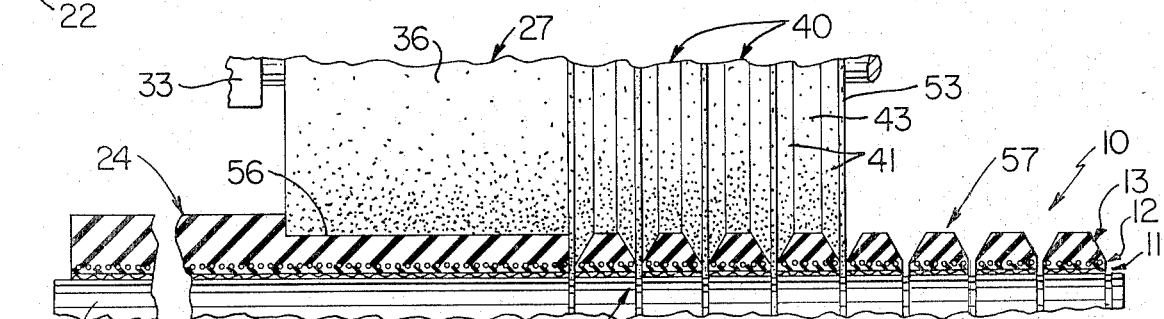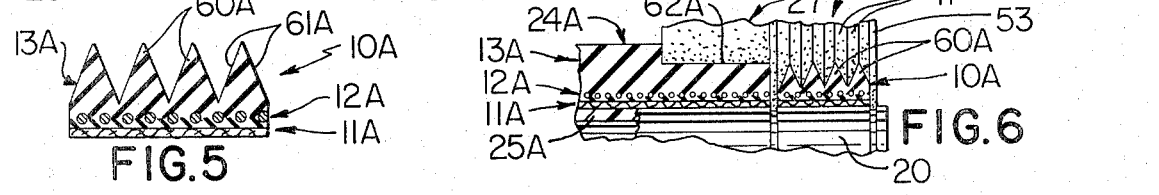

METHOD OF MAKING AN ENDLESS POWER TRANSMISSION BELT

BACKGROUND OF THE INVENTION

Endless power transmission belts, commonly referred to as V-belts, have occasionally been made previously utilizing grinding processes wherein the belts were first ground to a desired thickness and subsequently each belt was ground using a separate grinding wheel to define each non-parallel side of the belt. This technique is expensive because it requires both complex apparatus and skilled operators to provide acceptable belts. In addition, even with skilled operators and the best apparatus available it has been very difficult using this previous technique to obtain even a simple endless power transmission belt which has a true cross-sectional configuration throughout its entire length. Further, it is impractical with this technique to grind a satisfactory multiple-element belt wherein each element has non-parallel sides.

SUMMARY

This invention provides an inexpensive method of making a simple or multiple element endless power transmission belt which has opposed non-parallel portions and which has a precise configuration throughout its entire length. The method comprises the steps of building a belt construction on a mandrel, rotating said mandrel and belt construction about the longitudinal axis of the mandrel and operatively associating a contoured rotating grinding wheel with the rotating belt construction to precisely define the non-parallel portions by grinding and in a simultaneous manner.

Other details, uses, and advantages of this invention will be readily apparent from the exemplary embodiments thereof presented in the following specification, claims, and drawings.

BRIEF DESCRIPTION OF THE DRAWING

The accompanying drawing shows present preferred embodiments of this invention, in which FIG. 1 is a cross-sectional view illustrating one exemplary embodiment of an endless power transmission belt of this invention;

FIG. 2 is a view with parts in elevation, parts in cross-section, and parts broken away particularly illustrating one of a series of method steps employed to define a plurality of belts substantially identical to the belt of FIG. 1 in a simultaneous manner;

FIG. 3 is a step following the step of FIG. 2 which is used to define such plurality of belts;

FIG. 4 is a step following the step of FIG. 3;

FIG. 5 is a cross-sectional view illustrating another exemplary embodiment of an endless power transmission belt made using the method of this invention;

FIG. 6 is a view similar to a central portion of FIG. 3 illustrating a typical method step used to define the belt of FIG. 5.

DETAILED DESCRIPTION OF THE METHOD

Reference is now made to FIG. 1 of the drawing which illustrates one exemplary embodiment of an endless power transmission belt of this invention which is designated generally by the reference numeral 10. The belt 10 is made primarily of elastomeric materials and is comprised of a tension section 11, a load carrying section 12 defined by a spirally wound load carrying cord, and a compression section 13 which are suitably bonded together to define a unitary body construction. The tension section 11 of this exemplary belt 10 has an outer fabric layer 14.

The belt 10 is popularly referred to as a V-belt and has a substantially trapezoidal cross-sectional configuration and includes a pair of symetrically arranged non-parallel side portions or sides 15 and a pair of opposed parallel outside surfaces 16 and 17 defined respectively by the outside surface of the fabric layer 14 and a surface extending between those edges of the non-parallel sides 15 arranged remote from the layer 14.

The method of this invention may employ a right circular cylindrical mandrel 20, as shown in FIG. 2 which has a longitudinal axis 21 which coincides with the central longitudinal axis of a drive shaft 22 which is suitably keyed to the mandrel 20 and is used to drive or rotate such mandrel about the axis 21 and for this purpose a motor 23 is suitably operatively connected to the drive shaft 22. A belt construction which may also be referred to as a sleeve 24 is built on the mandrel 20 in accordance with techniques known in the art and prior to building the sleeve 24 on the mandrel 20 an expendable tubular member 25 is supported concentrically around the mandrel and preferably held in position by frictional engagement of its inside surface against the outside surface of the mandrel 20. The tubular member may be made of any suitable inexpensive material, such as an elastomeric material, for example, and the purpose of the tubular member will be explained in detail subsequently.

The sleeve 24 is built or formed on the mandrel 20 and in particular against the outside surface of the expendable tubular member 25 in accordance with techniques known in the art whereupon the tension section with its outside fabric layer is first formed in position, followed by spirally winding the load-carrying cord against the tension section, and followed by the compression section and for simplicity and easy correlation of these sections of the sleeve with corresponding sections of the endless power transmission belt 10 the tension section, load-carrying cord, and compression section have also been given the reference numerals 11, 12, and 13 respectively in the sleeve 24. These sleeve sections 11, 12, and 13 are suitably processed to define the sleeve 24 as a unitary bonded construction.

A plurality of belts 10 are defined in a simultaneous manner by operatively associating a rotating grinding wheel 27 with the sleeve 24 in a series of steps to be described subsequently and the detailed construction of the wheel 27 will now be described making particular reference to FIG. 3. The grinding wheel 27 is suitably fixed to a central drive shaft 30 which has a central longitudinal axis 31 which coincides with the axis of rotation of the grinding wheel 27 and the drive shaft 30 is suitably driven by a motor 32. The grinding wheel has a support and moving means or apparatus 33 of any suitable construction and the apparatus 33 has means designated schematically by the double arrow 34 for moving the grinding wheel 27 toward and away from the sleeve 24 and mandrel 20 and also has means designated schematically by the double arrow 35 for moving the grinding wheel parallel to the axis 21 of the mandrel 20.

The grinding wheel 27 has grinding means in the form of a right circular cylindrical surface portion 36, see FIG. 2, and a plurality of sets of integral contoured grinding means with each set being designated by the general reference numeral 40. Each set 40 of integral grinding means is comprised of a pair of substantially identical outwardly diverging integral grinding surfaces 41 which terminate in inner edges 42 adjoined by a right circular cylindrical grinding surface 43 of comparatively small axial length. The surface 43 and surfaces 41 of each set 41 are constructed and arranged so that once the grinding wheel 27 is brought into operative association or grinding engagement with the sleeve 24 they define surface 17 and non-parallel side portions of an associated belt 10.

The grinding wheel 27 may be made so that its right circular cylindrical portion 36 and sets 40 are an integral part of a single abrasive structure or unitary mass; however, it will be appreciated that grinding means having an abrasive surface which provides the function of the right circular cylindrical portion 36 may be provided as a separate component and suitably driven. Further, each set 40 with its grinding surfaces 41 and 43 may be made as a separate component with the desired plurality of components or sets 40 fixed together in adjoining relation on a common shaft.

The method of this invention will now be described in connection with the making of a plurality of four substantially identical V-belts 10 in a simultaneous manner and employing method steps illustrated in FIGS. 2–4. In particular, it will be seen that the sleeve 24 is built concentrically around the expendable tubular member 25 in the manner illustrated in FIG. 2 and the mandrel 20 and sleeve 24 are rotated by the motor 23 about their common longitudinal axis 21. The grinding wheel 27 is then moved by the apparatus 33 into operative association with one end portion of the sleeve 4 as illustrated at 45 in FIG. 2 whereupon the outside surface of the sleeve 24 is ground by the right circular cylindrical portion 36 of such grinding wheel to provide a right circular cylindrical surface 46 on the sleeve 24.

The apparatus 33 is then employed to move the grinding wheel 27 away from the sleeve 24 followed by movement of such wheel parallel to the axis 21 of mandrel 20 and to the left as seen in FIG. 2, followed by movement of the grinding wheel 27 into grinding engagement with the sleeve 24 as illustrated at 50 in FIG. 3. The grinding engagement shown at 50 results in the provision of another right circular cylindrical surface on the sleeve 24 while simultaneously defining a plurality of four belts 10 and it will be seen that each belt 10 is defined by an associated set 40 of integral grinding means. During the grinding operation shown in FIG. 3, it will be seen that, except for surface 16, the entire peripheral outline of each belt 10 is defined and this includes a pair of opposed wall portions 51 each adjoining an associated side portion 15; see FIG. 1.

The grinding wheel 27 has integral disc-like portions 53 each adjoining and serving as an integral connection between associated surfaces 41 of a pair of adjoining sets 40. The portions 53 cut into the expendable tubular member 25 a sufficient distance to completely define wall portions 51 yet not enough to damage the outside surface of the mandrel 20.

The grinding wheel 27 is then again retracted from the sleeve 24 followed by further axial movement to the left as viewed in FIG. 3 and then brought back into grinding engagement as shown at 55 in FIG. 4 whereby another right circular cylindrical surface 56 is defined on the sleeve and simultaneously an additional four belts 10 are defined. The four belts previously defined by the grinding operation illustrated in FIG. 3 remain firmly supported on the mandrel as shown at 57.

The apparatus 33 is again employed to move the grinding wheel in the manner described above until the entire sleeve 24 has been ground and belts are provided along the entire length of the mandrel 20. The completed belts 10 may be easily removed from the mandrel 20 by extracting such belts from an end of such mandrel 10 either individually or simultaneously followed by removal of the expendable tubular member 25, whereupon another tubular member 25 may be installed in position on the mandrel 20 and the method steps outlined above repeated to grind another sleeve 20 and another plurality of belts 10.

In this disclosure of the invention a plurality of four belts 10 are as shown as being defined in a simultaneous manner; however, it will be appreciated that this method may be used to make only one belt or any desired number of belts. In addition, it will be appreciated that the peripheral configuration of the belts 10 may be varied as desired merely by varying the configuration of each set of integral grinding means to correspond to the desired belt configuration.

It will also be appreciated that it is not necessary to grind completely through the sleeve 24 into the expendable tubular member 25 during the grinding operation whereby only a small thickness of the sleeve, such as the thickness of the fabric layer, remains. In this instance any suitable cutter of known construction may be employed to cut the substantially completely ground individual belts 10 apart and this may be achieved simply by continuing to rotate the mandrel 20 and bringing the cutter into cutting engagement between each immediately adjacent pair of belts 10.

Another exemplary embodiment of an endless power transmission belt construction or belt may be made using the method of this invention and such belt is illustrated in FIG. 5 of the drawing. The belt illustrated in FIG. 5 is very similar to the belt 10 except for the fact that it has a plurality of integral belt elements; therefore, such belt will be designated generally by the reference numeral 10A and parts of the belt 10A which are roughly similar to corresponding parts of the belt 10 will be designated by the same reference numerals as in the belt 10 also followed by the letter designation A and not described again in detail.

The belt 10A comprises a tension section 11A, a load carrying section in the form of a spirally wound load-carrying cord 12A, and a compression section 13A defined by a plurality of integral belt elements each designated by the reference numeral 60A. Each belt element 60A has opposed non-parallel portions or sides 61A which in this example intersect and define an inverted V-shaped configuration for its associated element.

The belt 10A is defined in a simultaneous manner utilizing method steps which are substantially identical with the steps illustrated in FIGS. 2, 3, and 4 and employed in connection with the grinding of a plurality of belts 10 in a simultaneous manner. Therefore, a detailed drawing presentation of these steps will not be made but instead only the presentation of FIG. 6 is made. In the presentation of FIG. 6 it will be seen that a grinding wheel and mandrel are employed which are substantially identical to the grinding wheel 27 and mandrel 20 and hence those portions of these apparatus which are illustrated have been designated by the same reference numerals as previously. The only major change that is required is in the detailed configuration of the sets 40 of integral grinding means which comprise the grinding wheel 27 and as will be described subsequently.

In particular, it will be seen that the belt 10A has a plurality of four integral interconnected belt elements 60A of inverted V-shaped configuration whereupon a corresponding four sets 40 of integral grinding means comprise the grinding wheel 27. Each of the sets 40 of the grinding means has a pair of symmetrically arranged substantially identical integral grinding surfaces 41 arranged in a V-shaped pattern which corresponds to the V-shaped pattern defined by the adjoining surfaces 61A.

To define each belt 10A a sleeve 24A similar to sleeve 24, is built up on an expendable tubular member 25A. The sleeve 24A is comprised of a tension section 11A, a loadcarrying cord 12A, and a compression section 13A to correspond to similarly identified portions of the belt 10A.

To define a belt 10A the grinding wheel 27 is moved by apparatus 33 into operative association with the sleeve 24A to first grind a right circular cylindrical surface on the sleeve 24A in a similar manner as illustrated in FIG. 2 The grinding wheel 27 is then operated by apparatus 33 in a similar manner as described in connection with FIG. 3 to completely define a belt 10A at the right end of the sleeve 24A while simultaneously grinding a surface 62A on such sleeve as illustrated in FIG. 6. The grinding wheel 27 may then be moved again in a similar manner as described above to grind another belt 10A and simultaneously form another cylindrical surface. This procedure is repeated until belts 10A are ground along the full axial length of the sleeve 24A.

In the description presented above, each belt 10 and 10A is ground from an associated sleeve 24 or 24A respectively after first grinding the particular sleeve to define a right circular cylindrical outside surface thereon; however, it will be appreciated that a completed belt 10 or a plurality of such belts as well as a completed belt 10A or a plurality of such belts may be made by grinding without first grinding the outside surface of the associated sleeve.

The belts 10 and 10A are preferably made of elastomeric materials and it will be appreciated that such elastomeric materials may include natural or synthetic rubbers or any suitable plastic material.

While present exemplary embodiments of this invention, and methods of practicing the same, have been illustrated and described, it will be recognized that this invention may be otherwise variously embodied and practiced within the scope of the following claims.

What is claimed is:

1. A method of making an endless power transmission belt having opposed non-parallel portions, said method comprising the steps of, building a belt construction on a mandrel having a longitudinal axis, rotating said mandrel and belt construction about said longitudinal axis, and operatively associating a rotating grinding wheel having a pair of integral grinding surfaces with said rotating belt construction to simultaneously grind said non-parallel portions.

2. A method as set forth in claim 1 and further comprising the step of grinding the outside surface of said belt construction with grinding means to provide a right circular cylindrical surface on said belt construction prior to said operatively associating step.

3. A method as set forth in claim 2 in which said grinding means comprises an integral cylindrical part of said rotating grinding wheel and said step of grinding the outside surface of said belt construction comprises grinding a portion of said belt construction with said integral cylindrical part at one axial position along said belt construction while simultaneously engaging said pair of integral grinding surfaces against a portion of said belt construction previously ground by said integral cylindrical part.

4. A method as set forth in claim 1 in which said non-parallel portions comprise opposed side portions, said integral grinding surfaces comprise annular symmetrically arranged diverging surfaces, and said operatively associating step comprises urging said rotating grinding wheel against said belt construction while holding its axis of rotation parallel to said longitudinal axis to define said non-parallel portions at opposite sides of said belt.

5. A method as set forth in claim 1 in which said belt has a substantially trapezoidal cross-sectional configuration with said non-parallel portions defining opposed side portions while being interconnected at their outer ends by the shorter of the parallel sides of said substantially trapezoidal cross-sectional configuration, said rotating grinding wheel has a pair of substantially identical symmetrically arranged and outwardly diverging integral grinding surfaces, with said pair of integral grinding surfaces having their inner edges adjoined by a right circular cylindrical grinding surface of small axial length, and said operatively associating step comprises urging said rotating grinding wheel against said belt construction to simultaneously define said side portions with said diverging grinding surfaces and the shorter of the parallel sides of said belt with said small axial length cylindrical surface.

6. A method as set forth in claim 1 and comprising the further step of supporting an expendable tubular member concentrically around said mandrel prior to said building step, and said operatively associating step comprises grinding through said belt construction and partially into said tubular member to completely define said belt.

7. A method as set forth in claim 6 in which said supporting step comprises supporting an expendable tubular member made of an elastomeric material and holding said expendable elastomeric tubular member in position by friction.

8. A method of making a plurality of endless power transmission belts in a simultaneous manner by grinding with each of said belts having a substantially trapezoidal cross-sectional configuration including a pair of opposed non-parallel portions, said method comprising the steps of, building a belt construction on a mandrel having a longitudinal axis, rotating said mandrel and belt construction about said longitudinal axis, providing a rotatable grinding wheel having a plurality of sets of integral grinding means corresponding in number to said plurality of belts with each of said sets of grinding means comprising a pair of diverging substantially identical integral grinding surfaces adjoined at their inner edges by an associated right circular cylindrical grinding surface of small axial length, and rotating said grinding wheel against said rotating belt construction to define said plurality of belts in a simultaneous manner by grinding with each belt having opposed non-parallel portions defined by associated diverging grinding surfaces.

9. A method as set forth in claim 8 in which said rotating step is achieved immediately following said building step with said belt construction having an unground outside surface.

10. A method as set forth in claim 8 and comprising the further step of supporting an expendable tubular member concentrically around said mandrel prior to said building step, and said rotating step comprises grinding through said belt construction and partially into said tubular member to completely define said plurality of belts.

11. A method of making an endless power transmission belt having a plurality of integral belt elements with each element having opposed non-parallel portions, said method comprising the steps of, building a belt construction on a mandrel having a longitudinal axis, rotating said mandrel and belt construction about said longitudinal axis, providing a rotatable grinding wheel having a plurality of sets of integral grinding means corresponding in number to said plurality of belt elements with each of said sets of grinding means comprising a pair of substantially identical integral grinding surfaces, and rotating said grinding wheel against said rotating belt construction to define said plurality of belt elements in a simultaneous manner by grinding with each belt element having its opposed non-parallel portions.

12. A method as set forth in claim 11 including the step of arranging said grinding surfaces of each set in a substantially V-shaped pattern to thereby define each element having its opposed non-parallel portions arranged in a V-shaped pattern.

* * * * *